(12) United States Patent
Stephan et al.

(10) Patent No.: US 10,521,426 B2
(45) Date of Patent: Dec. 31, 2019

(54) QUERY PLAN GENERATION FOR SPLIT TABLE QUERY OPERATIONS

(71) Applicant: SAP SE, Walldorf (DE)

(72) Inventors: Wolfgang Stephan, Heidelberg (DE); Klaus Otto Mueller, Karlsruhe (DE)

(73) Assignee: SAP SE, Walldorf (DE)

( * ) Notice: Subject to any disclaimer, the term of this patent is extended or adjusted under 35 U.S.C. 154(b) by 116 days.

(21) Appl. No.: 15/363,802

(22) Filed: Nov. 29, 2016

(65) Prior Publication Data

US 2018/0150516 A1 May 31, 2018

(51) Int. Cl.
*G06F 17/30* (2006.01)
*G06F 16/2453* (2019.01)
*G06F 16/2455* (2019.01)

(52) U.S. Cl.
CPC .... *G06F 16/24542* (2019.01); *G06F 16/2455* (2019.01); *G06F 16/24532* (2019.01)

(58) Field of Classification Search
CPC ......... G06F 17/30463; G06F 17/30477; G06F 17/30445; G06F 16/24542; G06F 16/2453; G06F 16/24532; G06F 16/24545; G06F 16/2455; G06F 16/24553; G06F 16/24554
See application file for complete search history.

(56) References Cited

U.S. PATENT DOCUMENTS

| 5,918,225 | A | 6/1999 | White et al. |
| 6,374,236 | B1 * | 4/2002 | Chen ................. G06F 16/24532 |
| 7,174,553 | B1 | 2/2007 | Reed et al. |
| 7,797,342 | B2 | 9/2010 | Banks et al. |
| 7,805,456 | B2 | 9/2010 | Meijer et al. |
| 8,977,600 | B2 | 3/2015 | Crupi et al. |
| 9,165,021 | B2 | 10/2015 | Bhattacharjee et al. |

(Continued)

FOREIGN PATENT DOCUMENTS

EP 2930629 A1 10/2015

OTHER PUBLICATIONS

Neumann, Thomas. "Efficiently compiling efficient query plans for modern hardware." Proceedings of the VLDB Endowment 4.9 (2011): 539-550.

(Continued)

*Primary Examiner* — Greta L Robinson
(74) *Attorney, Agent, or Firm* — Mintz Levin Cohn Ferris Glovsky and Popeo, P.C.

(57) ABSTRACT

A system for generating a query plan is provided. In some implementations, the system performs operations comprising: determining that a first query operation is a full table query operation, the full table query operation comprising a query operation operating on a database table as a whole; determining that a second query operation is a split table query operation, the split table query operation comprising a plurality of parallel query operations each operating on a portion of the database table; and inserting, based on the first query operation being a full table query operation and the second query operation being a split table query operation, a switch operation between the first and the second query operation, the switch operation being configured to distribute data output by the first query operation to the plurality of parallel query operations comprising the second query operation. Related methods and articles of manufacture are also described.

16 Claims, 4 Drawing Sheets

(56) References Cited

U.S. PATENT DOCUMENTS

| | | |
|---|---|---|
| 9,298,768 B2 * | 3/2016 | Varakin .............. G06F 9/5072 |
| 9,495,207 B1 | 11/2016 | Pjesivac-Grbovic et al. |
| 2001/0037322 A1 | 11/2001 | Lindsay et al. |
| 2004/0015511 A1 | 1/2004 | Seefeldt et al. |
| 2004/0078364 A1 * | 4/2004 | Ripley .............. G06F 16/2455 |
| 2004/0162822 A1 | 8/2004 | Papanyan et al. |
| 2004/0230559 A1 | 11/2004 | Newman et al. |
| 2005/0028134 A1 | 2/2005 | Zane et al. |
| 2005/0138000 A1 | 6/2005 | Roux et al. |
| 2007/0250470 A1 * | 10/2007 | Duffy .............. G06F 17/30445 |
| 2008/0033960 A1 | 2/2008 | Banks et al. |
| 2008/0098053 A1 | 4/2008 | Miao et al. |
| 2008/0281786 A1 * | 11/2008 | Duffy .............. G06F 16/24532 |
| 2008/0281846 A1 | 11/2008 | Hoang et al. |
| 2009/0006429 A1 | 1/2009 | Champion et al. |
| 2009/0030874 A1 | 1/2009 | Das et al. |
| 2009/0228434 A1 | 9/2009 | Krishnamurthy et al. |
| 2010/0262633 A1 | 10/2010 | Bhattacharjee et al. |
| 2010/0281017 A1 * | 11/2010 | Hu .................. G06F 17/30442 707/718 |
| 2012/0084315 A1 | 4/2012 | Schneider et al. |
| 2013/0054630 A1 | 2/2013 | Briggs et al. |
| 2013/0073573 A1 | 3/2013 | Huang et al. |
| 2013/0151502 A1 | 6/2013 | Yoon et al. |
| 2014/0089294 A1 | 3/2014 | Shankar et al. |
| 2014/0108861 A1 | 4/2014 | Abadi et al. |
| 2014/0172914 A1 | 6/2014 | Elnikety et al. |
| 2014/0280030 A1 | 9/2014 | Freedman et al. |
| 2014/0280037 A1 * | 9/2014 | Petride .............. G06F 17/30442 707/719 |
| 2014/0351233 A1 | 11/2014 | Crupi et al. |
| 2015/0026154 A1 | 1/2015 | Jeong et al. |
| 2015/0178305 A1 | 6/2015 | Mueller et al. |
| 2015/0186461 A1 | 7/2015 | Nica |
| 2015/0193500 A1 | 7/2015 | Aute et al. |
| 2015/0261820 A1 | 9/2015 | Cheng et al. |
| 2015/0269228 A1 | 9/2015 | Fisher et al. |
| 2017/0024433 A1 | 1/2017 | Neelakanthappa et al. |
| 2017/0228425 A1 | 8/2017 | Kandula et al. |
| 2017/0262516 A1 | 9/2017 | Horowitz et al. |
| 2018/0150513 A1 | 5/2018 | Willems et al. |
| 2018/0150514 A1 | 5/2018 | Willems et al. |
| 2018/0150515 A1 | 5/2018 | Merker et al. |

OTHER PUBLICATIONS

Herodotou, Herodotos, Nedyalko Borisov, and Shivnath Babu. "Query optimization techniques for partitioned tables." Proceedings of the 2011 ACM SIGMOD International Conference on Management of data. ACM, 2011 (12 pages).

* cited by examiner

QUERY PLAN GENERATION FOR SPLIT TABLE QUERY OPERATIONS

TECHNICAL FIELD

The subject matter described herein relates to database management, and more particularly, to the generation of query execution plans.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance.

SUMMARY

In one aspect, methods, systems, and articles of manufacture, including computer program products, are provided. A method may include: determining that a first query operation is a full table query operation, the full table query operation comprising a query operation that operates on a database table as a whole; determining that a second query operation is a split table query operation, the split table query operation comprising a plurality of parallel query operations that each operates on a portion of the database table; and inserting, based at least on the first query operation being a full table query operation and the second query operation being a split table query operation, a switch operation between the first query operation and the second query operation, the switch operation being configured to distribute data output by the first query operation to the plurality of parallel query operations comprising the second query operation.

In some variations, the plurality of parallel query operations may include a first parallel query operation operating on a first portion of the database table and a second parallel query operation operating on a second portion of the database table. The distributing of data output by the first query operation may include: distributing, to the first parallel query operation, the first portion of the database table output by the first query operation; and distributing, to the second parallel query operation, the second portion of the database table output by the first query operation. The first parallel query operation may be executed with the first portion of the database table as input, and the second parallel query operation may be executed with the second portion of the database table as input.

In some variations, the full table query operation may be performed by at least simultaneously loading, examining, and/or altering all data in the database table. The split table query operation may be performed by at least separately loading, examining, and/or altering data from one or more portions of the database table. The first query operation may be a sort operation or a hash join operation while the second query operation may be a filter operation or a projection operation. The first query may precede the second query.

In some variations, the method may further include: generating the query plan to include the first query operation, the second query operation, and the switch operation between the first query operation and the second query operation. The generating of the query plan may include replacing the second query operation with a plurality of parallel query operations, each of the plurality of parallel query operations operating on an individual portion of the database table.

Implementations of the current subject matter can include systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
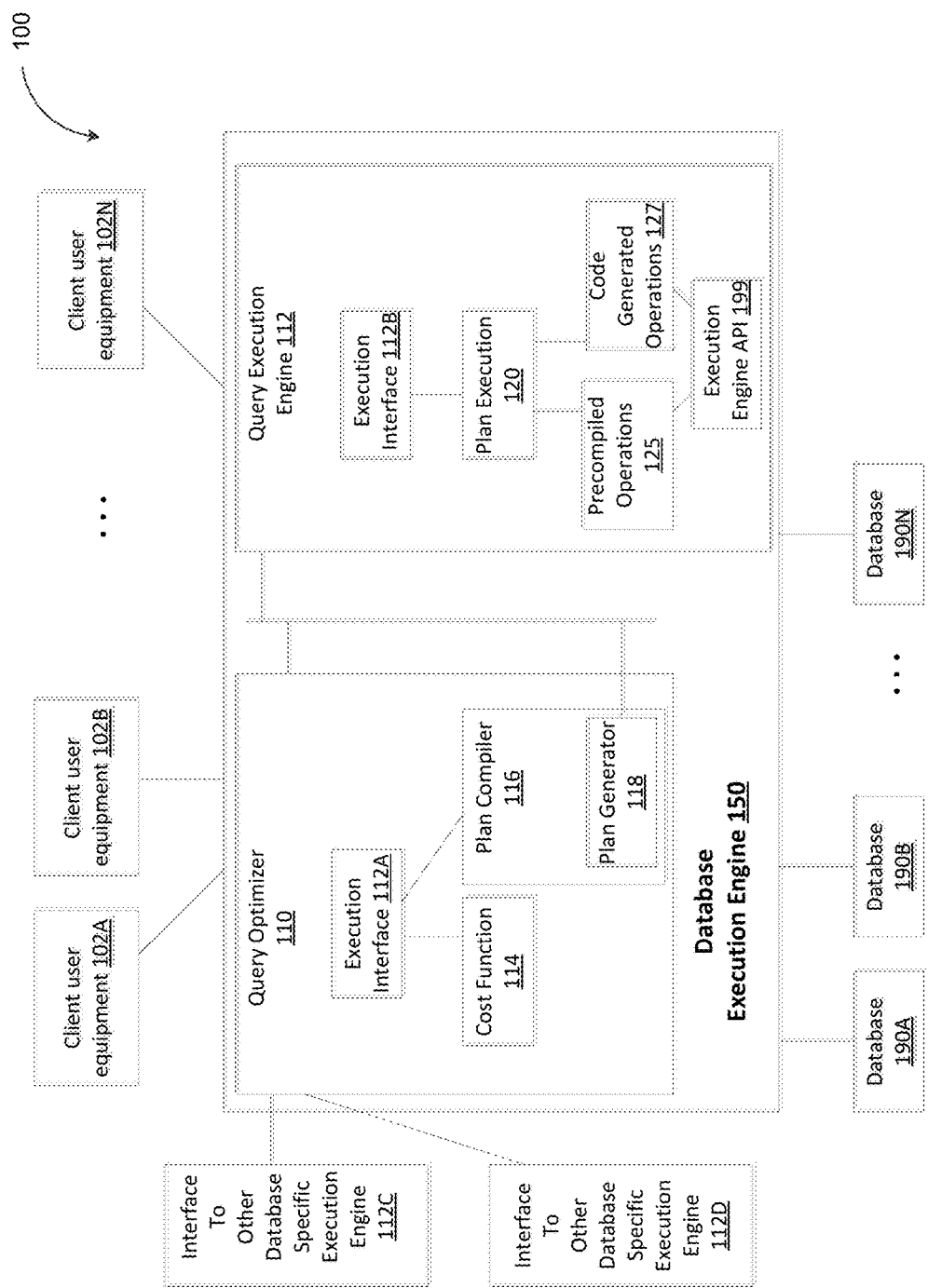
FIG. 1 depicts a block diagram for a system, in accordance with some example embodiments.

Database management systems and operations performed on the data managed by a database management system have become increasingly complex. For example, a database management systems (or database for short) can support relatively complex online analytical processing (OLAP, which can perform multi-dimensional analysis) to more straightforward transaction based online transaction processing (OLTP). Moreover, the database may be configured as a row-store database or column store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

From an application or client perspective, it can be extremely cumbersome to access databases. For example, an application may need to query different types of databases using complex queries. As a consequence, the application layer in this example would need to be configured to handle the various types of databases and the various query types. Additionally or alternatively, each database may need to process queries from the application into a format and structure that can be handled by the given database. Pushing complex operations and support for a variety of different database types to the application layer may contravene the need to have lighter weight and/or readily deployable applications. On the other hand, pushing complex operations to the database layer where data is stored may draw processing and/or memory resources at the database layer and may thus reduce the performance and response times for queries.

In some example embodiments, there may be provided an execution engine that may decouple the application layer from the database layer (e.g., the persistence or storage layer where data including database tables may be stored and/or queried). The execution engine may be separate from the database layer and the client application layer. According to some example embodiments, the execution engine may be configured to generate a query plan including one or more executable query operations. The execution engine may be further configured to optimize the query plan and compile the query plan by generating executable code (e.g., machine code) corresponding to the query plan.

Some of the query operations included in the query plan may be executed by the execution engine itself. For instance, more complex query operations (e.g., rule-based query operations such as joins, projections, and/or the like) may be performed by the execution engine itself. For query operations that are performed by the query engine itself, the query engine may perform these query operations while accessing the database layer whenever necessary in order to read, write, update, and/or perform other operations on the data stored and/or persisted at the database layer. Meanwhile, the query plan may also include query operations that are delegated to the database layer. These query operations may be relatively basic query operations including, for example, SQL commands (e.g., reads, writes, scans, and/or the like). For query operations that are delegated to the database layer, the execution engine may receive corresponding responses from the database layer where data is stored and these query operations (e.g., SQL commands such as reads, writes, scans, and/or the like) are performed.

In some example embodiments, a query plan may include both full table query operations and split table query operations. A full table query operation may operate on tables as a whole because performing the operation may include simultaneously loading, examining and/or altering all of the data in the table. For example, sorting the rows of a table (e.g., a SQL ORDER BY command) and hash joining two or more tables are full table query operations that may be performed on tables as a whole. By contrast, a split table query operation may operate on portions of a table because the performing the operation may include separately loading, examining, and/or altering data from individual portions of the table. For instance, filtering, materialization (e.g., projection), and equipartitioned joins (e.g., between two table partitions) may be split table query operations that can be performed on individual portions of a table and not on the table as a whole. According to some example embodiments, the query plan compiler 116 may replace a single split table query operation in the query plan with a plurality of parallel operations that each operates on a portion (e.g., partition and/or fragment) of the table.

As used herein, the portions of a table may refer partitions of the table. In some example embodiments, a table may be split into multiple partitions that are distributed across several storage and/or management nodes (e.g., in a distributed database). The table may be split in accordance with one or more partition criteria that indicate which rows in the table belong to which partition. For instance, a table may be partitioned, based on the contents of a date column, into a plurality of partitions that include the rows for a particular year. A query having a filter condition on the date column may cause the query execution engine to access only those partitions that contain rows matching the filter criteria.

Meanwhile, each partition in a table may include a plurality of fragments. In some example embodiments, a single partition may include one or more delta fragments, which may be stored and/or organized in a manner that optimizes the performance associated with effecting changes such as updates, inserts, and/or the like. Alternately and/or additionally, a single partition may also include a main fragment, which may be stored and/or organized in a manner that optimizes storage capacity and/or data compression. The delta fragments within a partition may be merged into the main fragment of the same partition.

In some example embodiments, the generating of a query plan that includes both full table query operations that operate on tables as a whole and split table query operations that operate on individual portions of a table includes the inserting of one or more switch operations. According to some example embodiments, a switch operation may be inserted between a full table query operation and a split table query operation. The switch operation may be configured to distribute data output by the full table query operation to each of the parallel operations forming the split table query operation.

In some example embodiments, the execution engine may be configured to support a wide range of database types to reduce, if not eliminate, the need for specialized execution engines for each type of database. For example, rather than having an execution engine for each type of database (e.g., an execution engine for an OLAP database, another execution engine for an OLTP database, an execution engine for a row-store database, an execution engine for a column-store database, and/or the like), the execution engine disclosed herein can perform execution of a query plan for both types and send queries to the different types of database layers (and/or their storage/persistence layer) and handle the corresponding responses.

FIG. 1 depicts an example of a system 100, in accordance with some example implementations.

The system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 1, the databases 190A represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via an execution engine 150 to the database layer 190A-B, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or type of optimizer, to receive at least one query from a user equipment and generate a query plan (which may be optimized) for execution by the execution engine 112. The query optimizer 110 may receive a request, such as a query, and then form or propose an optimized query plan. The query plan (which may be optimized) may be represented as a so-called "query algebra" or "relational algebra."

For example, SELECT Columns A and B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query plan optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimized query plan, which may represent query algebra or relational algebra, as noted above. To compile a query plan, the query optimizer 110 may provide the query plan to the query plan compiler 116 to enable compilation of some, if not all, of the code (e.g., for a query plan into machine code. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, the query plan compiler 116 may select pre-compiled code for a given operation as part of the optimization of the query plan, while for another operation in the query plan the plan compiler 116 may allow a compiler to generate the code. The pre-compiled and generated code represent code for executing the query plan, and this code may be provided to the plan generator 118, which interfaces the query execution engine 112.

In some example embodiments, the query optimizer 110 may generate a query plan that includes both full table query operations (e.g., sort, hash join, and/or the like) and split table query operations (e.g., filter, materialization, and/or the like). As such, the generating of the query plan may further include the insertion of switch operations between full table query operations and split table query operations. A switch operation may be configured to distribute data output by a full table query operation to each of a plurality of parallel query operations forming a split table query operation. For instance, a full table query operation may output a data chunk corresponding to a table in its entirety. This full table query operation may be followed by a split table query operation that includes at least a first parallel query operation operating on a first portion of the table and a second parallel query operation operating on a second portion of the table. In this scenario, the query optimizer 110 may insert a switch operation between the full table query operation and the parallel query operations forming the split table operation. The switch operation may be configured to distribute data from the data chunk output by the full table query operation to the appropriate parallel operation forming the split table query operation.

In some example embodiments, the database execution engine 150 may include a plan compiler 116 configured to compile the code corresponding to a query plan generated by the query optimizer 110. The query optimizer 110 may translate the query plan into code in high-level programming languages (e.g., C++) and/or low-level assembly languages (e.g., low level virtual machine assembly language). As such, the plan compiler 116 may be configured to compile code in high-level programming languages (e.g., C++) and/or low-level assembly languages (e.g., low level virtual machine assembly language) into code that can be directly executed by a computer processor and/or processing circuitry (e.g., numerical machine code and/or the like). The database execution engine 150 may further include a plan generator 118 configured to provide, to the query execution engine 112, the query plan subsequent to compilation by the plan compiler 116.

In some example embodiments, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, a query plan that has been generated by the query optimizer 110 and compiled by the plan compiler 116. It should be appreciated that the query execution engine 112 may also receive query plans and/or queries directly from a higher-level application or another device, such as user equipment 102A-N. The query execution engine 112 may then forward, via an execution interface 112B, the query plan to a plan execution engine 120. According to some example embodiments, the plan execution engine 120 may step through the query plan and determine to perform some of the query operations from the query plan within the database execution engine 150 and delegate other query operations for execution at one or more of the database layers 190A-N. Query operations delegated to the database layers 190A-N may be sent, to one or more of the database layers 190A-N, via an execution engine application programming interface (API).

To illustrate further, Table 1 below depicts an example of a query execution plan including a (1) TableScan (Filter X=1) and a (2) Materialization (Columns A, B). In this example, the TableScan would result in one or more calls via the execution engine API 199 to one or more of databases 190A-B. Specifically, the TableScan operation at Table 1 would result in a call for a dictionary look up for a value "X," an indexvector scan with a valueid obtained from the dictionary look up, which results in a document ID list. Then for each document ID, a call is made to look up the value IDs for columns A and B. The value IDs may be used to look up dictionary values to materialize the columns A and B including the actual data values for those columns.

TABLE 1

| Operation | Calls made on Database API |
| --- | --- |
| 1) TableScan (Filter X = 1) | dictionary lookup for value "X" indexvector scan with a valueid from the lookup, which results in a document ID (docid) list |
| 2) Materialization (Columns A, B) | For each docid, lookup value IDs (valueids) for columns A + B For the valueids, lookup dictionary value in dictionaries of A and B |

In some implementations, the query execution engine 150 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 150 may perform execution related to handling the differences between these two types of databases. This may enable a reduction in processing at the database layer. Moreover, the query execution engine 150 may perform other operations including rule-based operations, such as joins and projections, as well as filtering, group by, multidimensional analysis, and/or the like to reduce the processing burden on the database layer. In this way, the query execution engine 150 may perform these and other complex operations as part of a query plan, while the database's persistence/storage layer 190A-N can perform simpler operations to reduce the processing burden at the database's persistence/storage layer 190A-N.

In some example embodiments, the query execution engine 150 may provide for a plan execution framework that is able to handle data chunk(s), pipelining, and state management during query execution. Furthermore, the query execution engine 150 may provide the ability to access table storage via an abstract interface to a table adapter, which may reduce dependencies on specific types of storage/persistence layers (which may enable use with different types of storage/persistence layers).

Figure 2:
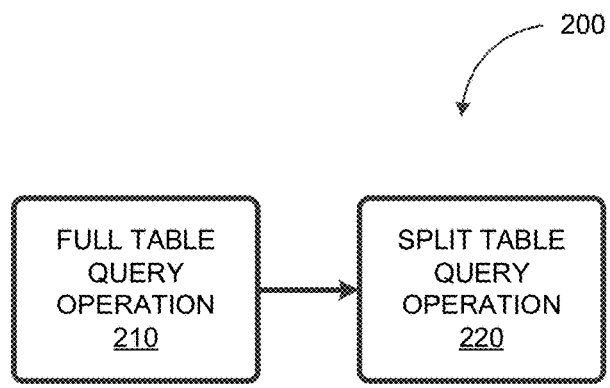
FIG. 2 depicts a query plan, in accordance with some example embodiments.

FIG. 2 depicts a query plan 200, in accordance with some example embodiments. Referring to FIGS. 1-2, the query plan 200 may correspond to the query algebra or relational algebra that the query optimizer 110 may generate for a particular query. The query plan 200 may include a plurality of consecutive query operations including, for example, a first query operation 210 and a second query operation 220. As shown in FIG. 2, the first query operation 210 may be a full table query operation that operates on tables as a whole. By contrast, the second query operation 220 may be a split table query operation that operates on individual portions (e.g., partitions and/or fragments) of a table. In some example embodiments, the database execution engine 150 (e.g., the query optimizer 110) may be configured to generate the query plan 200. The generating of the query plan 200 may include detecting when a split table query operation (e.g., the second query operation 220) follows a full table query operation (e.g., the first query operation 210) in the query plan 200. A switch operation may be inserted between a split table query operation (e.g., the second query operation 220) that follows a full table query operation (e.g., the first query operation 210) in the query plan 200.

Figure 3:
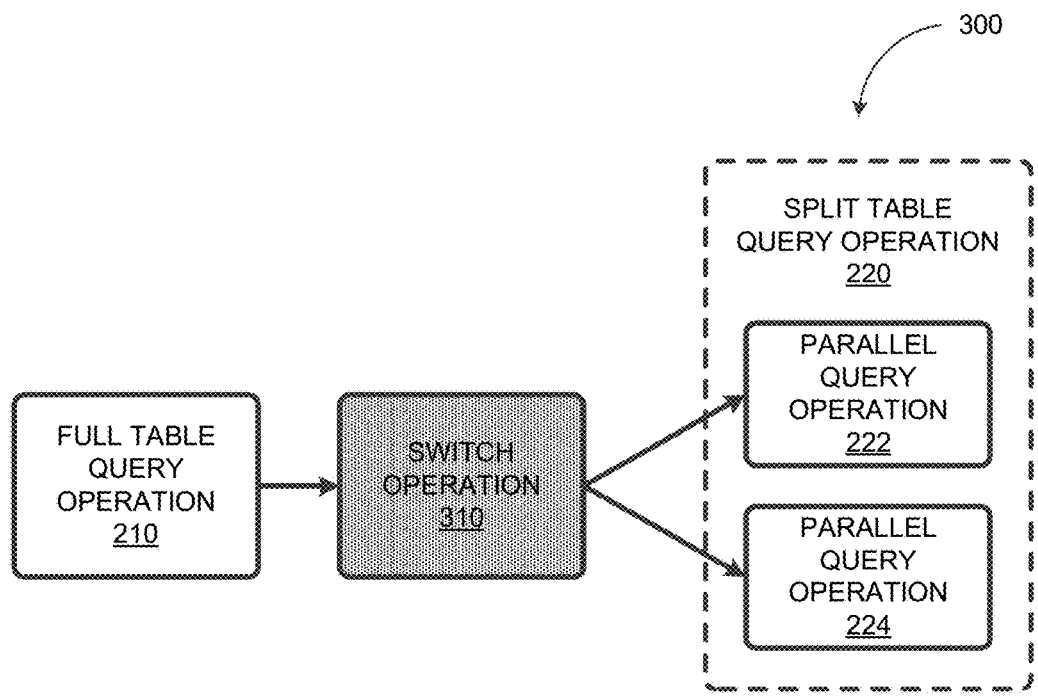
FIG. 3 depicts a query plan, in accordance with some example embodiments.

FIG. 3 depicts a query plan 300, in accordance with some example embodiments. Referring to FIGS. 1-3, the database execution engine 150 may insert a switch operation 310 between the first query operation 210 and the second query operation 220 because the second query operation 220 is a split table query operation that follows the full table first query operation 210.

As shown in FIG. 3, the second query operation 220 may be replaced (e.g., during the optimization of the query plan 300) with a plurality of parallel query operations including, for example, a first parallel query operation 222 and a second parallel query operation 224. Each of the plurality of parallel query operations forming the second query operation 220 may operate on a different portion (e.g., fragment and/or partition) of a table. For instance, the first parallel query operation 222 may operate on a main fragment of a table and the second parallel query operation 224 may operate on a delta fragment of the table, which stores changes to the main part of the table that may be merged (e.g., periodically) with the main part of the table. Thus, the switch operation 310 may be configured to distribute data output from the first query operation 210 to the appropriate parallel query operation forming the second query operation 220. For example, the switch operation 310 may distribute a main fragment of the table output by the first query operation 210 to the first parallel query operation 222 and a delta fragment of the table output by the first query operation 210 to the second parallel query operation 224.

Table 2 below depicts pseudocode for implementing the switch operation 310, which is configured to distribute data output by the full table first query operation 210 to the parallel query operations forming the split table second query operation 220. As shown in Table 2, the first query operation 210 may output a full table in one or more data chunks. Thus, the switch operation 310 may identify individual portions of the table (e.g., main fragment, delta fragment) and distribute the portions of the table to the appropriate parallel query operation forming the second query operation 220. Here, the switch operation 310 may distribute a portion of the table to a parallel query operation by at least causing the parallel query operation to execute (e.g., by calling a run( ) function) with that portion of the table as an input. Referring again to FIG. 3, the switch operation 310 may distribute a first portion (e.g., a main fragment) of the table to the first parallel query operation 222 by at least executing the first parallel query operation 222 with the first portion of the table as an input. Alternately and/or additionally, the switch operation 310 may distribute a second portion (e.g., a delta fragment) of the table to the second parallel query operation 224 by at least executing the second parallel query operation 224 with the second portion of the table as an input.

TABLE 2

```
SwitchOperator;;run(RunContext ctx, DataChunk input)
{
    If (input.datasource==FirstTablePortion)
        SplitTableOperator_FirstTablePortion.run(ctx, input)
    Else if (input.datasource==SecondTablePortion)
        SplitTableOperator_SecondTablePortion.run(ctx, input)
}
```

Figure 4:
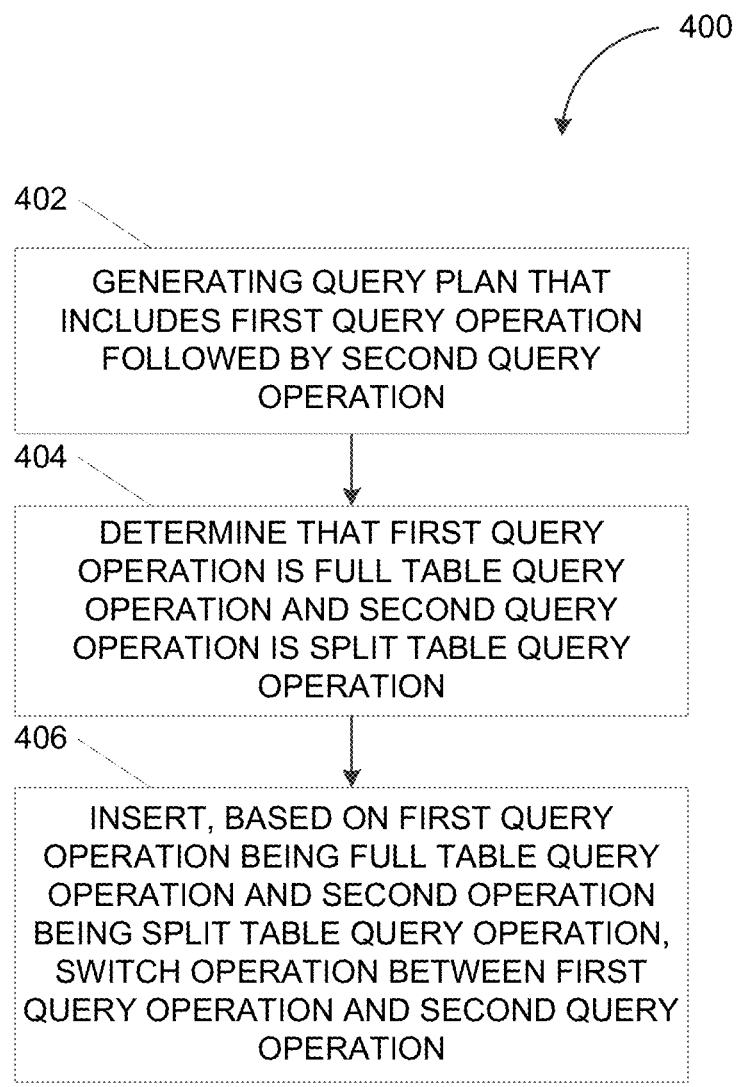
FIG. 4 depicts a flowchart illustrating a process for generating a query plan, in accordance with some example embodiments.

FIG. 4 depicts a flowchart illustrating a process 400 for generating a query plan, in accordance with some example embodiments. Referring to FIGS. 1-4, the process 400 may be performed by the database execution engine 150.

The database execution engine 150 may generate a query plan that includes a first query operation followed by a second query operation (402). For example, the database execution engine 150 (e.g., the query optimizer 110) may generate the query plan 200, which includes the first query operation 210 followed by the second query operation 220.

The database execution engine 150 may determine that the first query operation is a full table query operation and the second query operation is a split table query operation (404). For instance, the database execution engine 150 (e.g., the query optimizer 110) may determine that the first query operation 210 is a full table query operation (e.g., sort, hash join) that operates on tables as a whole and that the second query operation 220 is a split table query operation (filter, materialize) that operates on individual portions of a table. In some example embodiments, this determination may be based on a respective type of query operation associated with the first query operation 210 and the second query operation 220. For example, the database execution engine 150 may determine that first query operation 210 is a full table query operation when the first query operation 210 is a sort operation or a hash join operation. Alternately and/or additionally, the database execution engine 150 may determine that the second query operation 220 is a split table query operation when the second query operation 220 is a filter operation or a materialization (e.g., projection) operation. Alternately and/or additionally, the database execution engine 150 can distinguish between full table query operations and split table query operations based on an extent of the access to one or more tables required to perform each query operation. Performing a full table query operation (e.g., the first query operation 210) may require access to a table in its entirety while performing a split table operation (e.g., the second query operation 220) may require access to only one or more portions of a table.

The database execution engine 150 may insert, based at least on the first query operation being a full table query operation and the second query operation being a split table query operation, a switch operation between the first query operation and the second query operation (406). For instance, the database execution engine 150 (e.g., the query optimizer 110) may insert the split operation 310 between the first query operation 210 and the second query operation 220. The split operation 310 may be configured to distribute portions of data output by the first query operation 210 to the appropriate parallel query operation (e.g., the first parallel query operation 222, the second parallel query operation 224) forming the second query operation 220.

Figure 5:
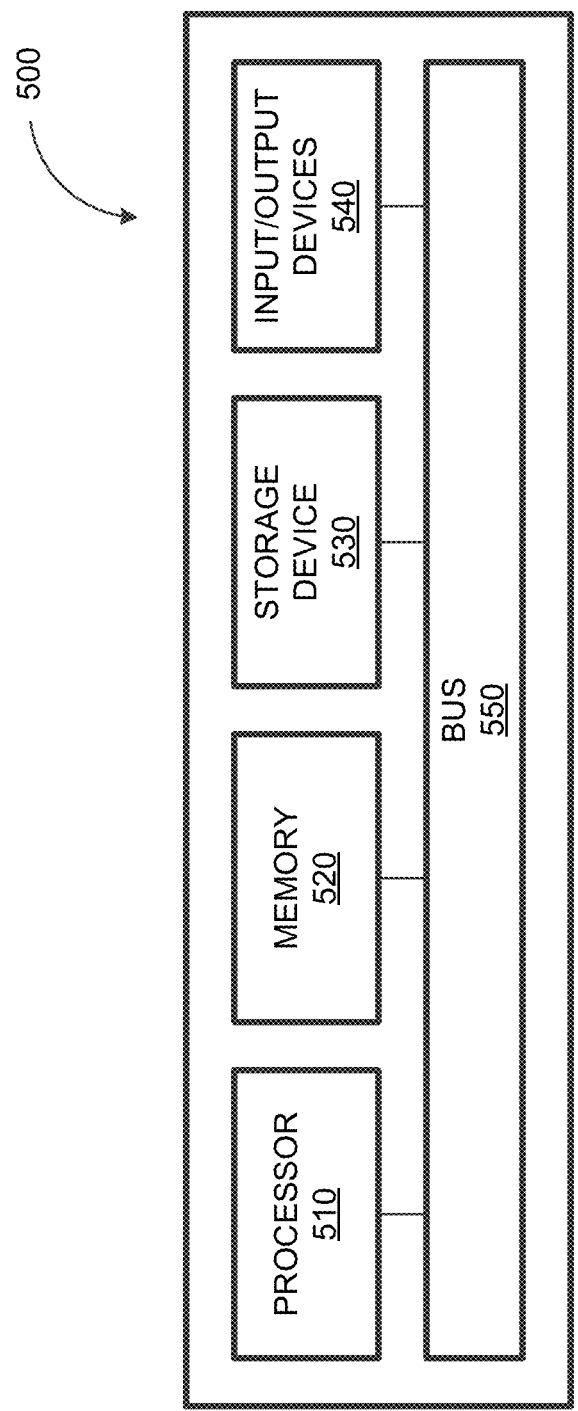
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the execution engine 150 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the execution engine 150. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods.

What is claimed is:

1. A system, comprising:
   at least one data processor; and
   at least one memory storing instructions which, when executed by the at least one data processor, result in operations comprising:
      determining that a first query operation comprises a full table query operation performed by at least loading, examining, and/or altering data in a database table as a whole;
      determining that a second query operation comprises a split table query operation performed by at least loading, examining, and/or altering a first portion of the database table separately from a second portion of the database table, the split table query operation including a first parallel query operation operating on the first portion of the database table and a second parallel query operation operating on the second portion of the database table; and
      in response to the first query operation preceding the second query operation, generating a query plan by a least inserting, between the first query operation and the second query operation, a switch operation, the switch operation being configured to distribute the database table output by the first query operation, the first portion of the database table being distributed to the first parallel query operation and the second portion of the database table being distributed to the second parallel query operation to at least enable the first parallel query operation to be performed in parallel with the second parallel query operation.

2. The system of claim 1, wherein the first parallel query operation is executed with the first portion of the database table as input, and wherein the second parallel query operation is executed with the second portion of the database table as input.

3. The system of claim 1, wherein the first query operation comprises a sort operation or a hash join operation, and wherein the second query operation comprises a filter operation or a projection operation.

4. The system of claim 1, wherein the query plan is generated to include the first query operation, the second query operation, and the switch operation interposed between the first query operation and the second query operation.

5. The system of claim 4, wherein the generating of the query plan further comprises replacing the second query operation with the first parallel query operation operating on the first portion of the database table and the second parallel query operation operating on the second portion of the database table.

6. A computer-implemented method, comprising:
determining that a first query operation comprises a full table query operation performed by at least loading, examining, and/or altering data in a database table as a whole;
determining that a second query operation comprises a split table query operation performed by at least loading, examining, and/or altering a first portion of the database table separately from a second portion of the database table, the split table query operation including a first parallel query operation operating on the first portion of the database table and a second parallel query operation operating on the second portion of the database table; and
in response to the first query operation preceding the second query operation, generating a query plan by a least inserting, between the first query operation and the second query operation, a switch operation, the switch operation being configured to distribute the database table output by the first query operation, the first portion of the database table being distributed to the first parallel query operation and the second portion of the database table being distributed to the second parallel query operation to at least enable the first parallel query operation to be performed in parallel with the second parallel query operation.

7. The method of claim 6, wherein the first parallel query operation is executed with the first portion of the database table as input, and wherein the second parallel query operation is executed with the second portion of the database table as input.

8. The method of claim 6, wherein the query plan is generated to include the first query operation, the second query operation, and the switch operation interposed between the first query operation and the second query operation.

9. The method of claim 8, wherein the generating of the query plan further comprises replacing the second query operation with the first parallel query operation operating on the first an individual portion of the database table and the second parallel query operation operating on the second portion of the database table.

10. The method of claim 6, wherein the first parallel query operation is executed with the first portion of the database table as input, and wherein the second parallel query operation is executed with the second portion of the database table as input.

11. The method of claim 6, wherein the first query operation comprises a sort operation or a hash join operation, and wherein the second query operation comprises a filter operation or a projection operation.

12. A non-transitory computer-readable storage medium including program code which when executed by at least one processor causes operations comprising:
determining that a first query operation comprises a full table query operation performed by at least loading, examining, and/or altering data in a database table as a whole;
determining that a second query operation comprises a split table query operation performed by at least loading, examining, and/or altering a first portion of the database table separately from a second portion of the database table, the split table query operation including a first parallel query operation operating on the first portion of the database table and a second parallel query operation operating on the second portion of the database table; and
in response to the first query operation preceding the second query operation, generating a query plan by a least inserting, between the first query operation and the second query operation, a switch operation, the switch operation being configured to distribute the database table output by the first query operation, the first portion of the database table being distributed to the first parallel query operation and the second portion of the database table being distributed to the second parallel query operation to at least enable the first parallel query operation to be performed in parallel with the second parallel query operation.

13. The computer-readable medium of claim 12, wherein the first parallel query operation is executed with the first portion of the database table as input, and wherein the second parallel query operation is executed with the second portion of the database table as input.

14. The computer-readable medium of claim 12, wherein the query plan is generated to include the first query operation, the second query operation, and the switch operation interposed between the first query operation and the second query operation.

15. The computer-readable medium of claim 14, wherein the generating of the query plan further comprises replacing the second query operation with the first parallel query operation operating on the first portion of the database table and the second parallel query operation operating on the second portion of the database table.

16. The computer-readable medium of claim 12, wherein the first parallel query operation is executed with the first portion of the database table as input, and wherein the second parallel query operation is executed with the second portion of the database table as input.

* * * * *